July 3, 1934.   M. G. KURTH   1,965,417

PISTON AND PACKING RING

Filed April 13, 1931

INVENTOR
Matthew G. Kurth
BY
Wheeler, Wheeler & Wheeler
ATTORNEYS

Patented July 3, 1934

1,965,417

UNITED STATES PATENT OFFICE 1,965,417

PISTON AND PACKING RING

Matthew G. Kurth, Madison, Wis.

Application April 13, 1931, Serial No. 529,633

5 Claims. (Cl. 309—36)

This invention relates to improvements in pistons and packing rings.

One of the primary objects of the invention is to provide an expansible piston having means for adjustably expanding its over-all diameter at each end, whereby compensation may be made for wear either in the piston or the cylinder in which it operates and side slap may be eliminated by maintaining the piston and cylinder in perfect alignment.

It is a further important purpose of the invention to provide a piston element adapted to function as an adjustable packing ring replaceable and interchangeable with reference to complementary parts of the piston and therefore comprising potentially a separate article of manufacture.

Further objects have reference to the convenient adjustment of the parts, means for maintaining them in proper adjustment, and means for maintaining a constant piston length irrespective of adjustments as to its diameter.

In the drawing.

Like parts are identified by the same reference characters throughout the several views.

Figure 1:
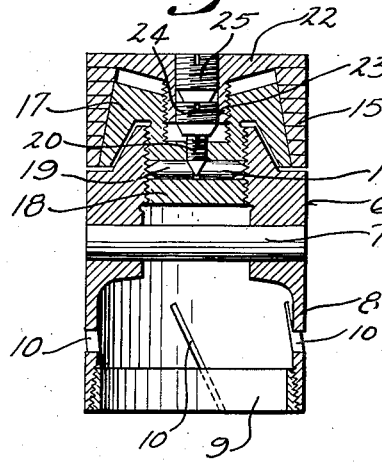
Figure 1 is a view in axial section through a piston assembly embodying the invention.
Figure 2:
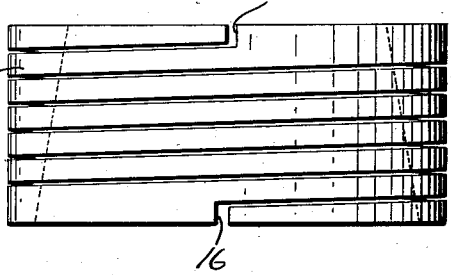
Figure 2 is an enlarged view of the expansible packing member in elevation.
Figure 3:
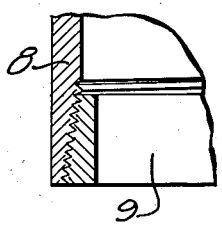
Figure 3 is a fragmentary detail in enlarged section through the expansible skirt portion of the piston.

The piston comprises a body portion 6 of the usual cylindrical form in which wrist pin 7 is fixed. Although it is not essential to the invention that the piston skirt 8 be invariably adjustable in the same way or, indeed, that it be adjustable at all, I have shown the piston skirt expansible in each embodiment of the invention by means of a tapered annular plug 9 threaded into a complementary internal taper in the end of the skirt, the latter being helically slotted at 10 for expansion. Any number of slots may be provided and any desired means employed to lock the plug in adjustment.

In each embodiment disclosed, the bearing surface of the piston assembly comprises a helix 15 of externally cylindrical and internally conical form, different means being shown for co-acting with the helix to expand its diameter. This helix functions as packing as well as providing an expansible bearing.

The helix 15 is preferably made of cast iron of the usual degree of resilience employed in packing rings to comprise a plurality of successive turns or coils of increasing radial thickness, the two end coils being so extended axially at 16 that the ends of the packing device are substantially planiform, parallel, and normal to the axis. In each instance a complementally tapered internal support is provided and means abuts the end of the helix to force it over the internal support to a predetermined position.

In the Fig. 1 construction the internal support comprises a frusto-conical member 17 having a stem 18 threaded in the body of the piston for axial adjustment. Its adjustment is fixed by pins 19 guided for radial movement and positioned in the pitch of the threads. A pointed screw 20 functions as a wedge to drive the pins into locking engagement with the piston.

The piston head 22 has a stem 23 threaded into the frusto-conical abutment 17 for axial adjustment and anchored by set screws 24 and 25.

The thrust of the piston head 22 upon the helix 15 expands said helix over the tapering abutment member 17 to any desired diameter. In order to compensate for the movement of the piston head in effecting such adjustment the abutment 17 is first released and threaded outwardly so that in the final analysis the piston head 22 is maintained at a fixed position respecting the body 6 of the piston, and the actual adjustment is made by a predetermined setting of the tapered abutment 17.

Figure 4:
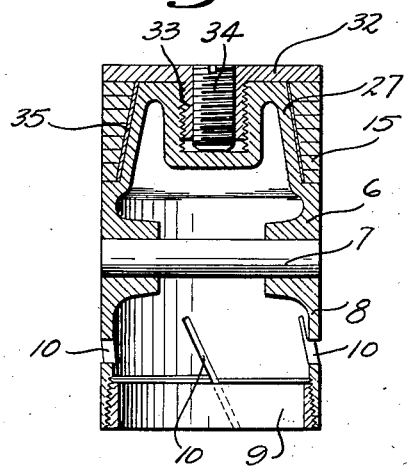
Figure 4 is a view similar to Figure 1 showing a modified embodiment of the invention.

In the Fig. 4 construction the abutment 27 is an integral part of the body 6 of the piston, and the piston head 32 is in threaded connection therewith by means of a stem 33 which is invariably turned down until the piston head is in face contact with the top of the abutment 27, thus maintaining a fixed overall length for the piston. A set screw 34 holds the piston head in place.

In this instance adjustment is not effected by any axial movement of the parts, but an equivalent result is obtained through the use of a hollow conical shim 35 fitted to the abutment and underlying the helix 15 so that when the piston head presses the helix downwardly over the shim the helix will be expanded to the desired degree.

Figure 5:
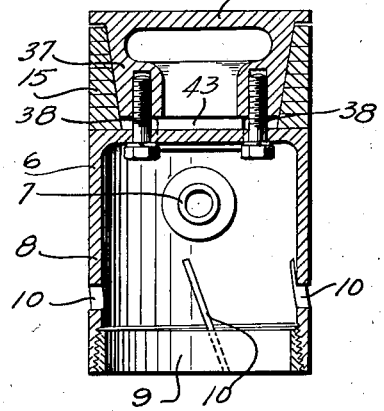
Figure 5 is a view in an axial section transverse to the wrist pin of a further modified embodiment of the invention.

In Fig. 5 the parts are virtually reversed, the abutment 37 being carried by the piston head 42. The helix 15 is inverted so that its thickest coils are remote from the head of the piston. A wide key at 43 guides the piston head and abutment for axial reciprocation respecting the body portion 6 of the piston, and the pair of adjusting bolts 38 accessible from beneath the piston serve to fix the position of the abutment in helix 15 and thereby to determine the degree of expansion of the helix. In this embodiment of the invention the length of the piston is not fixed, but it is possible to expand the piston diameter from below, which is advantageous when the piston is in an engine of which the head is not removable.

Tests involving the substitution of the type of piston herein disclosed for other pistons in commercial engines, have shown a very considerable increase in power attributable to my invention. The invention is particularly useful in heavy duty engines, especially those having horizontal cylinders where the wear is excessive and the engine is customarily under-rated in order to compensate for great loss of power occasioned by wear after a short period of operation.

In such engines a large part of the loss of power is due to the fact that the piston is permitted by the wear of the cylinder to assume an angular position slightly out of line with the cylinder axis, so that throughout the subsequent operation of the engine excessive friction is developed. Any such misalignment can be compensated by expanding or contracting either or both ends of a piston made in accordance with this invention, the type of expanding device shown at the piston head being particularly useful in that it is substituted for packing with increased efficiency.

It is found that the piston assembly herein disclosed functions admirably to prevent oil pumping. The helix 15 and the expanded skirt of the piston skirt the cylinder walls while the helical slots 10 permit the escape through the interior of the piston of any accumulations of oil trapped about the intermediate portion of the piston.

I claim:

1. In a piston, the combination with a helix having an internal taper, of a body portion and head portion confining the helix, and an abutment connected with one of said portions provided with a taper complementary to the helix and having means for its adjustment with respect to the helix for the expansion thereof, said abutment having a threaded stem in connection with the body portion of the piston, a pair of locking pins radially reciprocable in the stem, and a wedge adjustable between said pins for forcing them into engagement with said body portion.

2. In a piston, the combination with a helix having an internal taper, of a body portion and head portion confining the helix, and an abutment adjustably connected with one of said portions and provided with a taper complementary to the helix, said abutment having means for its adjustment with respect to the helix for the expansion thereof, and means for fixing the position of the abutment relative to said body portion.

3. In a piston, a hollow elongated body portion, a wrist pin bearing spaced from the ends thereof, a piston head connected with said body portion and capable of fixed adjustment in a plurality of positions relative to said wrist pin bearing, a helix confined between said body portion and said head portion and having an internal taper, and an abutment complementary to said internal taper and adjustable relative to said body portion and said head portion to fix the diameter of said helix.

4. In a piston, the combination with a packing helix having an internal taper, of a body portion and a relatively adjustable head portion normally contacting and confining the helix with its turns in contacting packing relation, tapered helix expanding means adjustable within the helix to cause helical and radial expansion thereof, and means for adjusting and securing the body and head portions in normally fixed relation to each other to hold the helix with its turns in fixed contacting relation to each other, whereby the helix may be secured in various conditions of expansion as a packing having fixed axial relation to the body of the piston without alteration of the degree of compression of combustible gases within a cylinder by reason of variations in the expansion of the helix.

5. In a piston, the combination with body and head portions, of a helical packing formed of resilient metal externally cylindrical and internally tapered axially of the helix, a conical expander fitted within the helix, means whereby said head, helix, and expander may be simultaneously adjusted with respect to said body portion, and means for adjusting said expander with respect to said head and securing the same in fixed relationship thereto, whereby said helix may be expanded without alteration of the degree of compression of combustible gases within a cylinder.

MATTHEW G. KURTH.